US012693700B2

(12) United States Patent (10) Patent No.: US 12,693,700 B2
Moteki et al. (45) Date of Patent: Jul. 28, 2026

(54) PEDAL ASSEMBLY

(71) Applicant: TOYOTA JIDOSHA KABUSHIKI KAISHA, Toyota (JP)

(72) Inventors: Taro Moteki, Zama (JP); Yoichiro Isami, Mishima (JP); Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/941,596

(22) Filed: Nov. 8, 2024

(65) Prior Publication Data

US 2025/0155914 A1 May 15, 2025

(30) Foreign Application Priority Data

Nov. 13, 2023 (JP) ................................. 2023-193235

(51) Int. Cl.
| | |
|---|---|
| *G05G 5/03* | (2008.04) |
| *B60L 15/20* | (2006.01) |
| *G05G 1/38* | (2008.04) |
| *G05G 1/44* | (2008.04) |
| *G05G 5/05* | (2006.01) |

(52) U.S. Cl.
CPC ................ *G05G 5/03* (2013.01); *B60L 15/20* (2013.01); *G05G 1/38* (2013.01); *G05G 1/44* (2013.01); *G05G 5/05* (2013.01); *B60L 2250/26* (2013.01); *G05G 2505/00* (2013.01)

(58) Field of Classification Search
CPC ...................................................... G05G 1/38
See application file for complete search history.

(56) References Cited

U.S. PATENT DOCUMENTS 3,302,763 A * 2/1967 Wobrock ................. G05G 1/30
192/89.2
4,319,497 A * 3/1982 Shinto ..................... G05G 7/04
74/512
(Continued)

FOREIGN PATENT DOCUMENTS

EP 1883881 B1 10/2010
JP S63-050732 U 4/1998
(Continued)

OTHER PUBLICATIONS

USPTO Machine Translation (from FIT database) of the Description of EP 1883881 B1, Dautry, Oct. 20, 2010. (Year: 2025).*

*Primary Examiner* — Daniel D Yabut
(74) *Attorney, Agent, or Firm* — Dinsmore & Shohl LLP

(57) ABSTRACT

A downsized pedal assembly adapted to imitate a turnover property of a conventional clutch pedal. A pedal assembly comprising: a pedal arm joined to a stationary member through a supporting member; and a spring applying a reaction force to the pedal arm. One end of the spring is joined to the stationary member through a fixed pivotal joint, and the other end of the spring is joined to an arm pivotal joint. The arm pivotal joint is withdrawn from a neutral line drawn between the supporting member and the fixed pivotal joint. An angle between a line drawn between the supporting member and the arm pivotal joint and the neutral line is narrower than an angle between a line drawn between the fixed pivotal joint and the arm pivotal joint and the neutral line.

7 Claims, 7 Drawing Sheets

(56)                    References Cited

U.S. PATENT DOCUMENTS

| | | | |
|---|---|---|---|
| 4,522,082 A * | 6/1985 | Musumiya ............. | G05G 1/445 |
| | | | 192/99 S |
| 4,800,774 A | 1/1989 | Hagiwara et al. | |
| 4,907,468 A | 3/1990 | Hagiwara et al. | |
| 5,038,907 A * | 8/1991 | Baumann ................. | G05G 5/03 |
| | | | 74/518 |
| 5,044,223 A * | 9/1991 | Mizuma ................... | G05G 7/04 |
| | | | 192/111.12 |
| 6,722,225 B1 * | 4/2004 | Martinovsky ........... | G05G 1/00 |
| | | | 74/513 |
| 2015/0153761 A1 * | 6/2015 | Min ......................... | G05G 1/44 |
| | | | 74/512 |
| 2021/0229550 A1 * | 7/2021 | Isami .................. | B60L 15/2054 |
| 2022/0041070 A1 | 2/2022 | Isami et al. | |

FOREIGN PATENT DOCUMENTS

| | | | |
|---|---|---|---|
| JP | 2018-013923 A | 1/2018 |
| JP | 6787507 B1 | 11/2020 |
| JP | 2021-118569 A | 8/2021 |
| WO | 2007/003810 A2 | 1/2007 |

* cited by examiner

PEDAL ASSEMBLY

CROSS-REFERENCE TO RELATED APPLICATIONS

The present disclosure claims the benefit of Japanese Patent Application No. 2023-193235 filed on Nov. 13, 2023 with the Japanese Patent Office.

BACKGROUND

Technical Field

Embodiments of the present disclosure relate to the art of a pedal assembly that is arranged in a vehicle to control behavior of the vehicle.

Discussion of the Related Art

JP-B2-6787507 discloses one example of an electric vehicle in which only an electric motor serves as a prime mover. The electric vehicle described in JP-B2-6787507 is configured to pseudo-reproducing a manual gear change operation of a manual transmission vehicle. To this end, the electric vehicle described in JP-B2-6787507 is provided with an accelerator pedal, a brake pedal, a shift lever, and a clutch pedal. Specifically, the shift lever is operated to select a mode of any one of a plurality of modes in which torque characteristics of the electric motor differ in stages with respect to a rotational speed of the electric motor. The clutch pedal is operated when the shift lever is operated to allow a driver to virtually enjoy the manual shifting operation.

In a conventional vehicle having a manual transmission, a length of stroke of the clutch pedal is not proportional to a pedal force (or reaction force) applied thereto. For example, in a pedal assembly in which a diaphragm spring is employed, a reaction force established by the diaphragm spring decreases gradually after the clutch pedal is depressed deeper than a predetermined angle. That is, the pedal assembly of this kind has a so-called "turnover property". In some embodiments, in order to accurately imitate such behavior of the clutch pedal arranged in the conventional vehicle having a manual transmission, the clutch pedal may be adapted to be arranged in the electric vehicle to imitate such turnover property.

JP-A-2018-13923 discloses a pedal device having the above-mentioned turnover property (also known as drop off property). According to the teachings of JP-A-2018-13923, specifically, a four-linkage structure is employed to achieve the drop off property. To this end, the pedal device described in JP-A-2018-13923 comprises: a lever member that pivots around a support shaft; a linkage member in which one end thereof is joined to the support shaft of the lever member in a pivotal manner to extend toward a vehicle body; an energization member in which one end thereof is also joined to the support shaft of the lever member in a pivotal manner to extend toward the vehicle body; a linkage member supporting arm in which one end thereof is joined to the other end of the linkage member through a supporting end in a pivotal manner; an energization member supporting arm in which one end thereof is joined to the other end of the energization member through another supporting end in a pivotal manner; and a rotational member supporting other ends of those arms in a pivotal manner while maintaining an angle between those arms. The energization member includes a linkage joined to the lever member, a linkage joined to the energization member supporting arm, and an elastic member interposed between those linkages.

In the pedal device described in JP-A-2018-13923, the supporting ends are situated at the same level as the support shaft of the lever member and the rotational member before a pedal is depressed. When the pedal is depressed, the lever member is rotated counterclockwise about a lever supporting shaft toward the front side of the vehicle. Consequently, the linkage member is pushed toward the front side of the vehicle and the energization member are pulled toward the rear side of the vehicle. Specifically, the linkage member is moved downwardly forward while the energization member is moved downwardly backward. In this situation, therefore, the elastic member is compressed so that the reaction force applied to the lever member is increased. Then, when the pedal is further depressed, the energization member is moved downwardly forward. Consequently, the elastic member is extended so that the reaction force applied to the lever member is reduced. Thus, according to the teachings of JP-A-2018-13923, the energizing force of the elastic member is increased until the elastic member is moved to a predetermined position, and reduced after the elastic member is further moved from the predetermined position. That is, the pedal device taught by JP-A-2018-13923 is provided with the above-mentioned drop off property.

In order to imitate the behavior of the clutch pedal arranged in the conventional vehicle having a manual transmission in the electric vehicle taught JP-B2-6787507, the pedal device taught by JP-A-2018-13923 may be applied to the electric vehicle taught JP-B2-6787507. However, in the pedal device taught by JP-A-2018-13923, the linkage structure including the elastic member and the rotational member is arranged in the front side of the vehicle in the depressing direction of the pedal. In addition, since the linkage structure is arranged in such a manner as to extend the linkage member and the elastic member in the longitudinal direction of the vehicle, the pedal device taught by JP-A-2018-13923 is elongated in the longitudinal direction of the vehicle. As described, the clutch pedal is arranged in the electric vehicle taught by JP-B-6787507 only to allow the driver to virtually enjoy the manual shifting operation. Therefore, the clutch pedal described in JP-B2-6787507 is not mechanically connected to other member mechanisms. That is, even if the clutch pedal described in JP-B-6787507 is depressed, the pedal force applied to the clutch pedal will not be transmitted to other mechanisms. In addition, the clutch pedal described in JP-B2-6787507 is irrelevant to the travelling performance of the electric vehicle. Therefore, in some embodiments, in order to arrange the clutch pedal of this kind in e.g., electric vehicles flexibly and easily without interference with other members, the clutch pedal of this kind may be downsized. Further, in some embodiments, in order to prevent the reduction in the traveling performance of a vehicle to which the clutch pedal of this kind is applied, the weight of the clutch pedal of this kind may be reduced.

SUMMARY

Aspects of embodiments of the present disclosure have been conceived noting the foregoing technical problems, and it is therefore an object of the present disclosure to provide a downsized pedal assembly adapted to imitate a so-called "turnover property" of a conventional clutch pedal for manipulating a manual transmission.

The present disclosure relates to a pedal assembly comprising: a pedal arm in which one end is joined to a predetermined stationary member through a supporting member in a pivotal manner; a pedal pad formed on the other end of the pedal arm; and a spring that applies a reaction force to the pedal arm against a torque derived from a pedal force applied to the pedal pad to rotate the pedal arm around the supporting member. In order to achieve the above-explained objective, according to the exemplary embodiment of the present disclosure, one end of the spring is joined to the predetermined stationary member through a fixed pivotal joint, and the other end of the spring is joined to an arm pivotal joint arranged in the pedal arm between the pedal pad and the supporting member. Specifically, the arm pivotal joint is arranged at a site withdrawn from a neutral line drawn between the supporting member and the fixed pivotal joint in a reciprocating direction of the pedal arm. In addition, an angle between a line drawn between the supporting member and the arm pivotal joint and the neutral line is narrower than an angle between a line drawn between the fixed pivotal joint and the arm pivotal joint and the neutral line.

In a non-limiting embodiment, the pedal assembly may further comprise another spring that applies a reaction force to the pedal arm against the torque derived from the pedal force. One end of the another spring may be joined to the predetermined stationary member through another fixed pivotal joint, and the other end of the another spring may be joined to another arm pivotal joint arranged in the pedal arm. Another arm pivotal joint may be withdrawn from the neutral line in the reciprocating direction of the pedal arm.

In a non-limiting embodiment, each of the spring and the another spring may be adapted to apply the reaction force derived from an elastic force to the pedal arm.

In a non-limiting embodiment, the arm pivotal joint and the another arm pivotal joint may be situated across the neutral line.

In a non-limiting embodiment, the spring and the another spring may include a coil spring and a torsion coil spring.

In a non-limiting embodiment, the another spring may further include a tension spring.

In a non-limiting embodiment, a plurality of the tension springs may be arranged in parallel to apply elastic tensile force to the pedal arm in the same direction.

In a non-limiting embodiment, the pedal assembly may be applied to an electric vehicle in which an electric motor is adopted as a prime mover. The pedal assembly may further comprise a clutch sensor that detects a depression angle of the pedal arm, and the electric motor may be controlled based on a detection signal transmitted from the clutch sensor.

In a non-limiting embodiment, the electric vehicle may comprise a shifting device, and a virtual gear stage governed by a rotational speed and an output torque of the electric motor may be shifted among a plurality of stages by operating the shifting device.

Thus, in the pedal assembly according to the exemplary embodiment of the present disclosure, the reaction force is applied to the pedal arm from the spring against the torque derived from the pedal force applied to the pedal pad. To this end, one end of the spring is joined to the predetermined stationary member through the fixed pivotal joint, and the other end of the spring is joined to the arm pivotal joint arranged in the pedal arm between the pedal pad and the supporting member. As described, the arm pivotal joint is arranged at the site withdrawn from the neutral line drawn between the supporting member and the fixed pivotal joint in the reciprocating direction of the pedal arm. In a situation where the pedal arm is not depressed, the angle between the line drawn between the supporting member and the arm pivotal joint and the neutral line is narrower than the angle between the line drawn between the fixed pivotal joint and the arm pivotal joint and the neutral line. That is, a distance between the fixed pivotal joint and the arm pivotal joint is shorter than a distance between the supporting member and the arm pivotal joint. Therefore, when the pedal force is applied to the pedal pad to depress the pedal arm, the angle between the line drawn between the supporting member and the arm pivotal joint and the neutral line is reduced more than the angle between the line drawn between the fixed pivotal joint and the arm pivotal joint and the neutral line. Specifically, when the pedal force is applied to the pedal pad to depress the pedal arm, the arm pivotal joint revolves around the supporting member while compressing and expanding the spring. Consequently, the reaction force applied to the pedal arm from the spring is varied non-linearly in a quadratic manner. According to the exemplary embodiment of the present disclosure, therefore, a driver is allowed to virtually enjoy the above-mentioned "turnover property" of the conventional clutch for manipulating the manual transmission when depressing the pedal arm.

In the pedal assembly according to the exemplary embodiment of the present disclosure, the spring is joined directly to the arm pivotal joint and the fixed pivotal joint. That is, the pedal arm serves as a linkage member. According to the exemplary embodiment of the present disclosure, therefore, the above-mentioned "turnover property" may be imitated by a simple structure while downsizing the pedal assembly.

In addition, the pedal arm is elastically returned to an initial position by the springs. Therefore, the pedal arm will not be vibrated in the situation where the pedal force is not applied to the pedal pad.

As described, a torsion coil spring may be adopted as the springs. In this case, the pedal assembly according to the exemplary embodiment of the present disclosure may be further downsized as compared to a case in which a compression spring or a tension spring is employed.

In a case of arranging a pair of another springs in parallel, a shorter spring in which the number of coils is relatively small may be adopted as each of another springs. In this case, therefore, the pedal assembly according to the exemplary embodiment of the present disclosure may be further downsized in the vertical direction.

In addition, the pedal assembly according to the exemplary embodiment of the present disclosure may be arranged in the electric vehicles without being connected to other members. Therefore, the pedal assembly according to the exemplary embodiment of the present disclosure may be arranged flexibly in any kind of electric vehicles.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE EMBODIMENT(S)

Embodiments of the present disclosure will now be explained with reference to the accompanying drawings. Note that the embodiments shown below are merely examples of the present disclosure which should not limit a scope of the present disclosure.

Figure 1:
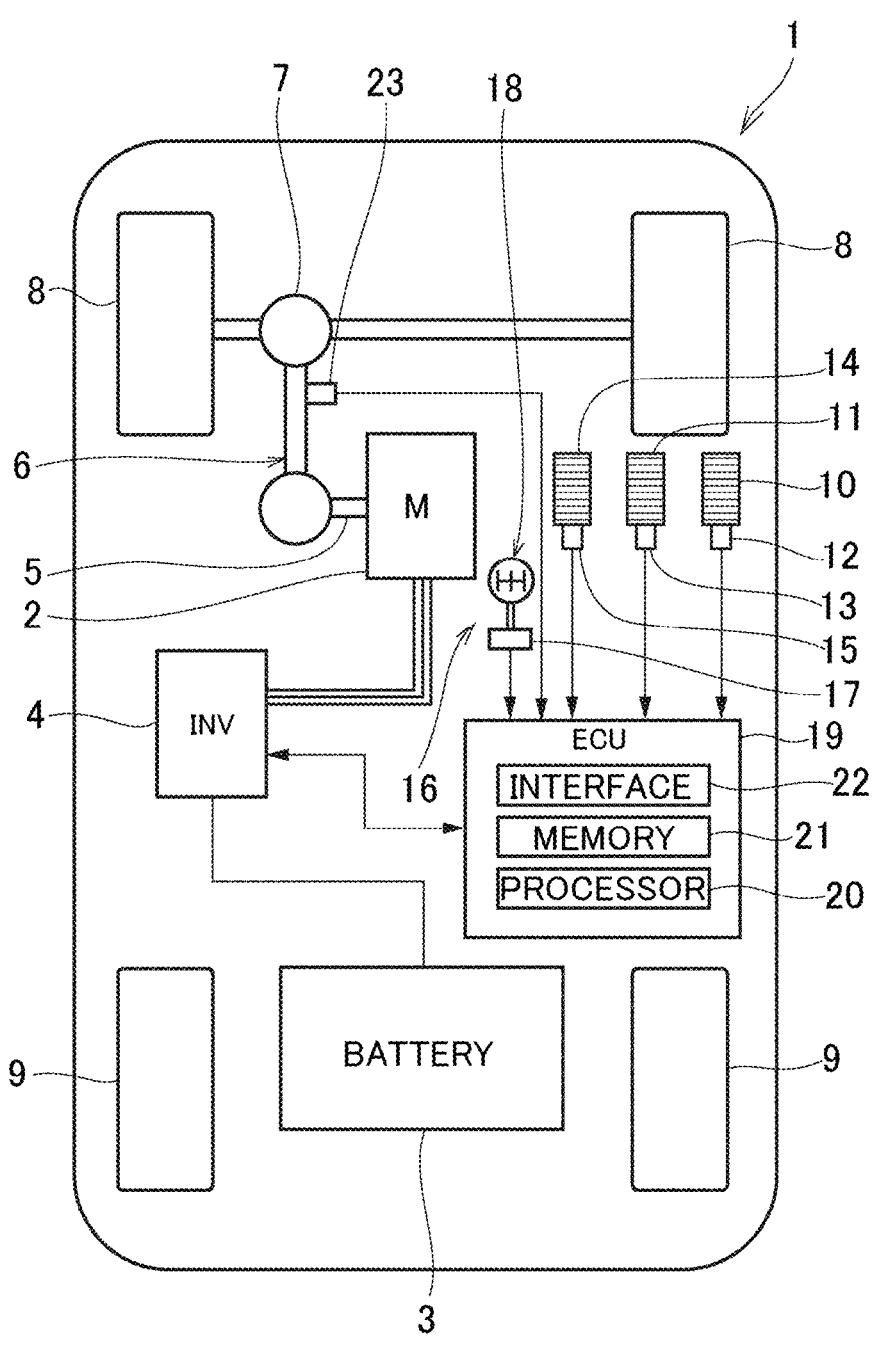
FIG. 1 is a schematic illustration showing one example of a powertrain and a control system of an electric vehicle to which the pedal assembly according to the exemplary embodiment of the present disclosure is applied.

Referring now to FIG. 1, there is shown one example of a structure of an electric vehicle (hereinafter simply referred to as the vehicle) 1 to which the pedal assembly according to the exemplary embodiment of the present disclosure is applied. As the above-mentioned electric vehicle described in JP-B2-6787507, the vehicle 1 is adapted to allow a driver to virtually enjoy a manual shifting operation. As schematically illustrated in FIG. 1, the vehicle 1 is provided with an electric motor (hereinafter simply referred to as the motor) 2 serving as a prime mover. An output torque generated by the motor 2 is controlled by controlling an electric current supplied from an electric storage device as a battery 3 to the motor 2 by an inverter (referred to as INV in FIG. 1) 4. In order to propel the vehicle 1, the output torque of the motor 2 is delivered from an output shaft (i.e., a rotor shaft) 5 of the motor 2 to a final reduction unit (i.e., a differential gear unit) 7 through a transmission mechanism 6 including gears and a transmission shaft, and distributed from the final reduction unit 7 to a pair of drive wheels 8. Thus, in the vehicle 1 shown in FIG. 1, a speed ratio of the torque transmitting path from the motor 2 to the drive wheels 8 is fixed. That is, the vehicle 1 does not have a speed change function for changing the speed ratio. In the vehicle 1, another pair of wheels 9 is not connected to the motor 2.

A propulsion force to propel the vehicle 1 is controlled by an accelerator pedal 10, and a braking force to decelerate the vehicle 1 is controlled by a brake pedal 11. A position (i.e., a depression) of the accelerator pedal 10 representing a driving force required by the driver is detected by an accelerator sensor 12, and a depression of the brake pedal 11 or a pedal force applied to the brake pedal 11 is detected by a brake sensor 13. In order to allow a driver to virtually enjoy the manual shifting operation as performed in the conventional vehicle having a manual transmission, the vehicle Ve is provided with a clutch pedal 14 and a shifting device 18 including a shift lever 16 and a shift position sensor 17. The shift lever 16 is moved among forward positions corresponding to virtual gear stages, a neutral position, and a reverse position to select an operating mode of the vehicle 1. A position of the clutch pedal 14 is detected by a clutch sensor 15, and a position of the shift lever 16 is detected by the shift position sensor 17.

An electronic control unit (to be abbreviated as ECU hereinafter) 19 is electrically connected with the motor 2 through the inverter 4 to control the motor 2. The ECU 19 is composed mainly of a microcomputer including a CPU (as a processor) 20, a memory 21 including a RAM and a ROM, and an input-output interface 22. The accelerator sensor 12, the brake sensor 13, the clutch sensor 15, and the shift position sensor 17 are connected to the ECU 19 so that positions of the accelerator pedal 10, the brake pedal 11, the clutch pedal 14, and the shift lever 16 are transmitted from those sensors to the ECU 19 in the form of detection signals. In addition, a speed sensor 23 that detects a rotational speed of e.g., a propeller shaft of the transmission mechanism 6, and a pedal angle sensor that detects a rotational angle of the pedal arm 25 are also connected to the ECU 19. Therefore, a rotational speed of e.g., the propeller shaft of the transmission mechanism 6 and an angle of the pedal arm 25 are also transmitted from those sensors to the ECU 19 in the form of detection signals.

For example, in order to adjust a driving torque generated by the motor 2 to be delivered to the transmission mechanism 6 to a required drive torque, the ECU 19 may be configured to execute the torque control taught by JP-B2-6787507. According to the exemplary embodiment of the present disclosure, specifically, the ECU 19 is configured to change the driving torque generated by the motor 2 to propel the vehicle 1 in such a manner as to simulate or imitate a change in a torque in the conventional vehicle having a manual transmission. For example, by depressing the clutch pedal 14 deeper than a predetermined position during propulsion, a virtual clutch output torque is reduced with an increase in a depression of the clutch pedal 14, and the virtual clutch output torque is reduced to zero when the clutch pedal 14 is depressed to a deepest position.

Specifically, the virtual clutch output torque is a simulated output torque of a clutch arranged in the conventional vehicle having a manual transmission. The virtual clutch output torque may be calculated by multiplying a virtual engine output torque being delivered from the motor 2 to the drive wheels 8 by a gain which varies in accordance with a depression of the clutch pedal 14. Specifically, the gain is maintained to 1 (i.e., 100%) as long as the depression of the clutch pedal 14 falls within a range from 0 to a predetermined angle, and reduced from 1 with an increase in the depression of the clutch pedal 14 from the predetermined angle.

The virtual engine output torque is a simulated output torque of an engine arranged in the conventional vehicle. Specifically, characteristics of the virtual engine output torque is set by simulating output characteristics of an arbitrarily selected conventional vehicular engine as a relation between a speed and an output torque of said conventional vehicular engine. To this end, a virtual engine speed is calculated based on a rotational speed of the drive wheel 8 taking account of a virtual speed ratio and a virtual clutch slippage, and the virtual engine output torque is calculated based on the virtual engine speed and the simulated output characteristics.

When the virtual clutch output torque is reduced to zero and the actual torque propelling the vehicle 1 drops temporarily, the driver is supposed to select a desired virtual gear stage by operating the shift lever 16. Then, the clutch pedal 14 is returned gradually by the driver, that is, a depression of the clutch pedal 14 is reduced gradually. Consequently, the above-mentioned gain is increased so that the virtual clutch output torque is increased. As a result of selecting the desired virtual gear stage, the virtual speed ratio employed to calculate the virtual engine speed has been changed. In this situation, therefore, the virtual engine speed and the virtual engine output torque are changed. Consequently, a torque determined by the virtual engine output torque thus changed and the virtual clutch output torque is generated by the motor 2.

That is, the motor 2 is controlled to change the output torque thereof in line with the torque characteristics (i.e., a relation between the rotational speed and the output torque) selected by the above-explained virtual shifting operation. Thus, in the vehicle 1 powered only by the motor 2, the virtual gear stage (i.e., the virtual speed ratio) is shifted by manipulating the shift lever 16 and the clutch pedal 14 so that the driver is allowed to virtually enjoy a manual shifting operation. As mentioned above, such control of the driving torque generated by the electric motor in response to the virtual manual shifting operation is explained in detail in e.g., JP-B2-6787507.

Next, a structure of the clutch pedal 14 as the pedal assembly according the first embodiment will be explained with reference to FIGS. 2, 3, and 4. As described, the clutch pedal 14 is arranged in the vehicle 1 to allow the driver to virtually enjoy the manual shifting operation as performed in the conventional vehicle having a manual transmission. The clutch pedal 14 is not mechanically connected to other member mechanisms in the vehicle 1, therefore, a torque established by depressing the clutch pedal 14 is not transmitted to other mechanisms. According to the exemplary embodiments of the present disclosure, specifically, an electric signal representing a depression, a depression angle, a length of stroke, or a position of the clutch pedal 14 detected by the clutch sensor 15 is transmitted to the ECU 19. In order to imitate the behavior of the conventional vehicle having a manual transmission, the ECU 19 controls the motor 2 to change the driving force or the torque in accordance with a change in the virtual clutch output torque based on the electric signal transmitted thereto from the clutch sensor 15.

Figure 2:
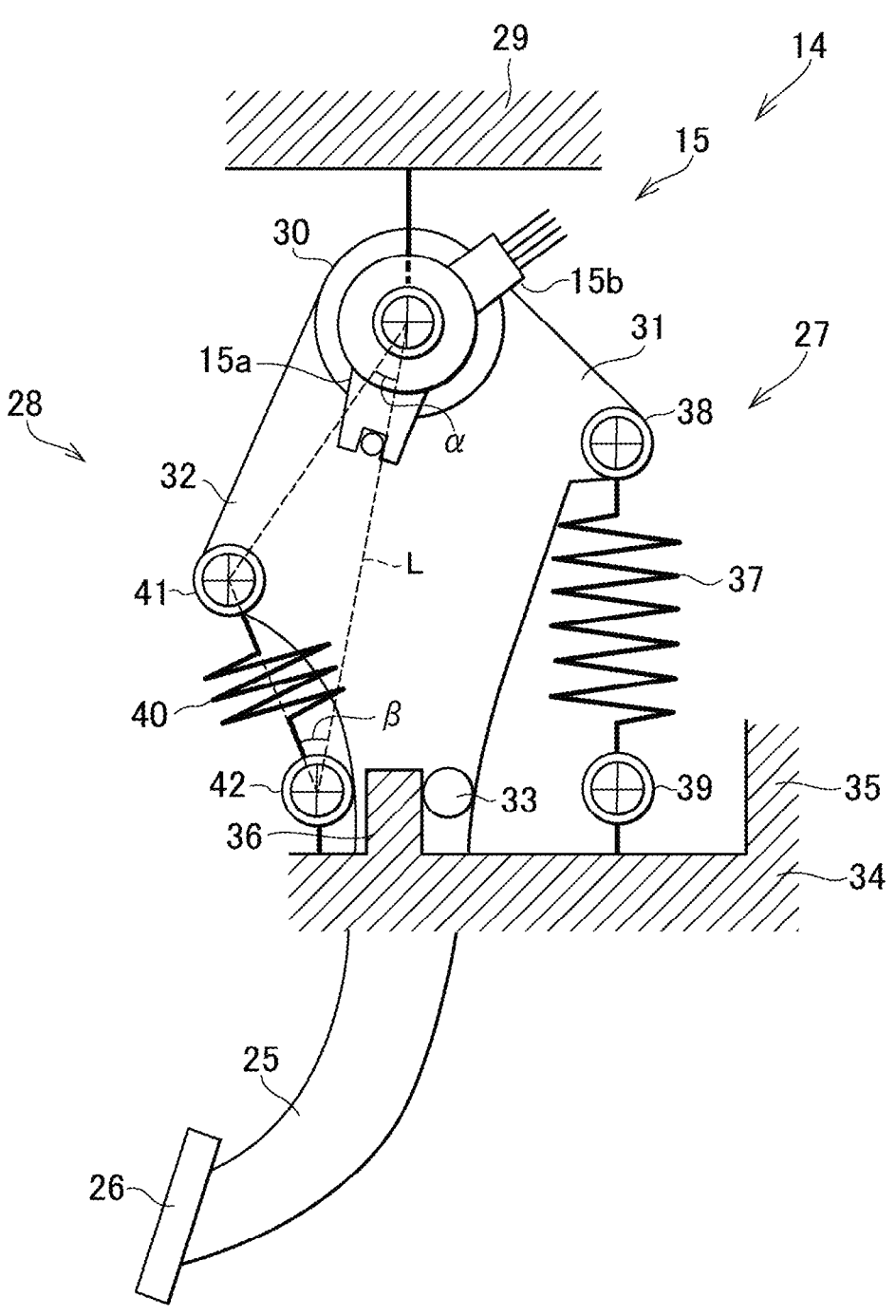
FIG. 2 is a cross-sectional view showing a cross-section of the pedal assembly according to the first embodiment of the present disclosure viewed from the right in a situation where a pedal arm is positioned at an initial position.

As illustrated in FIG. 2, the clutch pedal 14 comprises a pedal arm 25, a pedal pad 26, a first reaction mechanism 27, and a second reaction mechanism 28. As described, FIG. 2 shows a cross-section of the clutch pedal 14 viewed from the right side of the vehicle 1. That is, the first reason mechanism is arranged in the front side of the vehicle 1, and the second rection mechanism is arranged in the rear side of the vehicle 1.

The pedal arm 25 as an arcuate member is suspended downwardly from a predetermined stationary member 29 of the vehicle 1. Specifically, as illustrated in FIG. 2, a support shaft 30 as a supporting member is supported by the stationary member 29 in such a manner as to extend in the width direction of the vehicle 1, and an upper end of the pedal arm 25 in FIG. 2 is supported by the support shaft 30 in a pivotal manner. In order to detect a depression or an angular position of the pedal arm 25 when the pedal arm 25 is depressed, the above-mentioned clutch sensor 15 is attached to the support shaft 30, and the information about such depression of the pedal arm 25 detected by the clutch sensor 15 is transmitted to the ECU 19 in the form of electric signal. In the example shown in FIG. 2, the clutch sensor 15 includes a rotary element 15a that is rotated around the support shaft 30 in response to a reciprocating movement of the pedal arm 25, and a detector 15b that detects a rotational angle of the rotary element 15a.

The pedal arm 25 comprises a first projection 31 protruding toward the front section of the vehicle 1, a second projection 32 protruding toward the rear side of the vehicle 1, and a pedal pad 26 formed on the lower end of the pedal arm 25. Specifically, the first projection 31 and the second projection 32 are formed on both sides of a vertical line drawn downwardly from the stationary member 29 in the longitudinal direction of the vehicle 1.

In addition, a pin 33 extends in the transverse direction from a substantially intermediate portion of the pedal arm 25 in the vertical direction, and a front restriction portion 35 and a rear restriction section 36 are formed on another stationary member 34. The pin 33 is brought into contact with the front restriction portion 35 when the pedal arm 25 is depressed to the deepest position, and brought into contact with the rear restriction section 36 when the pedal arm 25 is returned to the initial position. Thus, a rotational range of the pedal arm 25 is restricted between the front restriction portion 35 and the rear restriction section 36. Another stationary member 34 may be formed integrally with the stationary member 29 but also formed separately from the stationary member 29. Accordingly, the stationary member 29 and another stationary member 34 serve as the stationary member of the exemplary embodiment of the present disclosure. The pin 33 may be formed not only on the right side of the pedal arm 25 but also on the left side of the pedal arm 25. In a case that the pin 33 is formed on both sides of the pedal arm 25, the front restriction portion 35 and the rear restriction section 36 are also formed on both sides of the pedal arm 25.

The pedal pad 26 may be formed integrally with the lower end of the pedal arm 25 but also be attached to the lower end of the pedal arm 25. In any of those cases, the pedal pad 26 is designed to allow the driver to depress the clutch pedal 14 easily, and an installation angle of the pedal pad 26 is adjusted to allow the driver to depress the clutch pedal 14 easily.

The first reaction mechanism 27 is adapted to exert a reaction force against a torque derived from the pedal force applied to the pedal pad 26 to rotate the pedal arm 25 around the support shaft 30. To this end, the first reaction mechanism 27 is arranged between the first projection 31 of the pedal arm 25 and another stationary member 34 of the vehicle 1. The first reaction mechanism 27 comprises a first spring 37 as a tension spring adapted to establish the reaction force against the torque derived from the pedal force applied to the pedal pad 26 to depress the pedal arm 25, a first arm pivotal joint 38 arranged in the first projection 31, and a first fixed pivotal joint 39 arranged in a lower end section of the first spring 37. Specifically, an upper end of the first spring 37 is joined to the first arm pivotal joint 38. Whereas, a lowest end of the first spring 37 is joined to another stationary member 34, and the first fixed pivotal joint 39 is arranged in the lower end section of the first spring 37. Since the tension spring is adopted as the first spring 37, the first projection 31 of the pedal arm 25 is pulled downwardly by an elastic tensile force (i.e., a tension) of the first spring 37 so that the clutch pedal 14 is returned to the initial position in the situation where the pedal force is not applied to the pedal pad 26. When the clutch pedal 14 is depressed, the first arm pivotal joint 38 revolves upwardly around the support shaft 30, and the upper end of the first spring 37 is pulled upwardly by such upward movement of the first arm pivotal joint 38. However, since the lowest end of the first spring 37 is joined to another stationary member 34, the first fixed pivotal joint 39 will not be moved upwardly in this situation. In the exemplary embodiment of the present disclosure, the first spring 37 serves as another spring, the first arm pivotal joint 38 serves as another arm pivotal joint, and the first fixed pivotal joint 39 serves as another fixed pivotal joint.

Here will be explained an action of the first reaction mechanism 27 when the clutch pedal 14 is depressed in more detail. FIG. 2 shows a situation in which the pedal force is not applied to the pedal pad 26. In this situation, the pedal arm 25 is positioned at a rear end position as the initial position and the pin 33 is brought into contact with the rear restriction section 36. As illustrated in FIG. 2, in the situation where the pedal arm 25 is thus positioned at the initial position, the first arm pivotal joint 38 is aligned with the first fixed pivotal joint 39 in the vertical direction so that the first spring 37 remains vertical.

Figure 3:
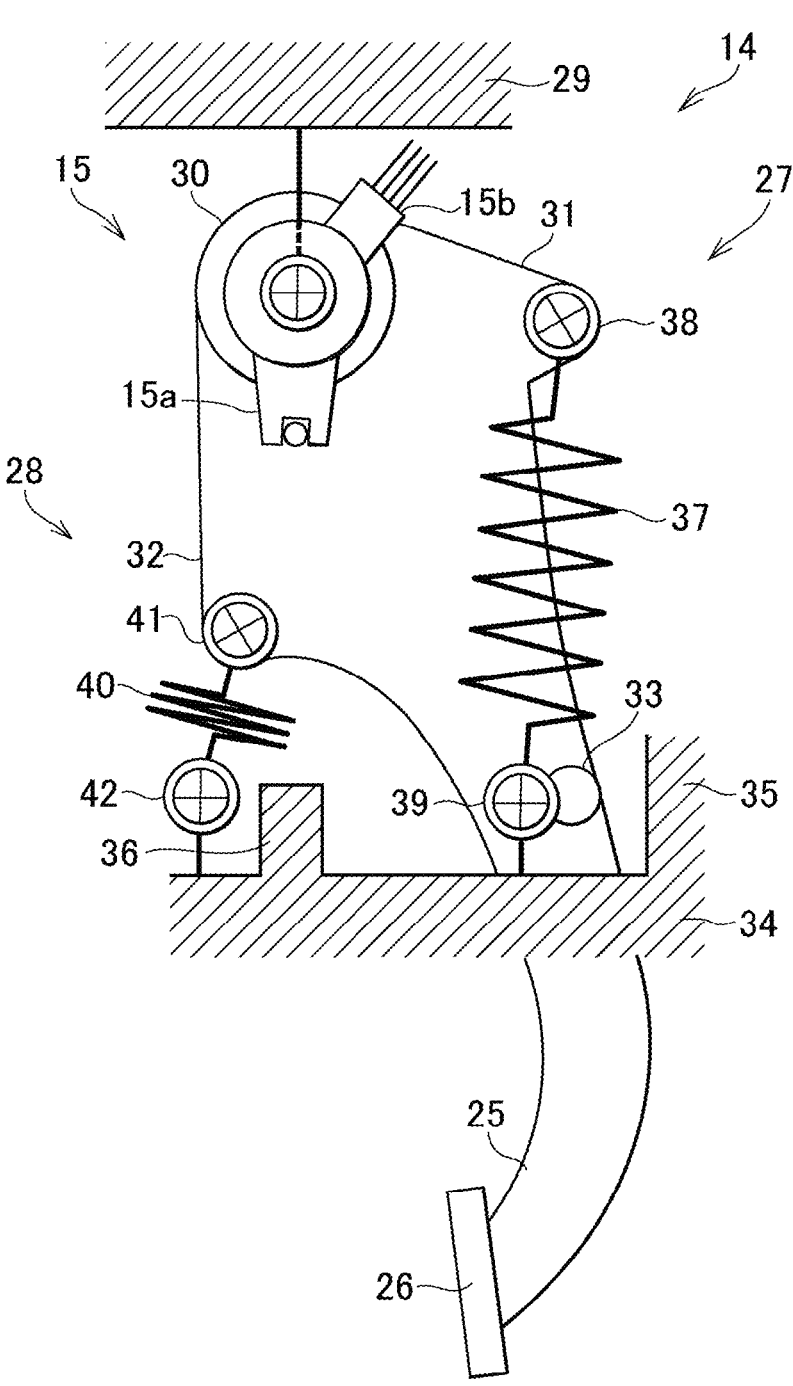
FIG. 3 is a cross-sectional view showing a cross-section of the pedal assembly according to the first embodiment of the present disclosure viewed from the right in a situation where the pedal arm is positioned at an intermediate position.

FIG. 3 shows a situation in which the pedal force is applied to the pedal pad 26 to depress the pedal arm 25 to an intermediate position. In this situation, the pin 33 is isolated away from the rear restriction section 36, and the first arm pivotal joint 38 revolves upwardly around the support shaft 30. That is, a distance between the first arm pivotal joint 38 and the first fixed pivotal joint 39 is increased from an initial distance therebetween with a depression of the pedal arm 25.

Figure 4:
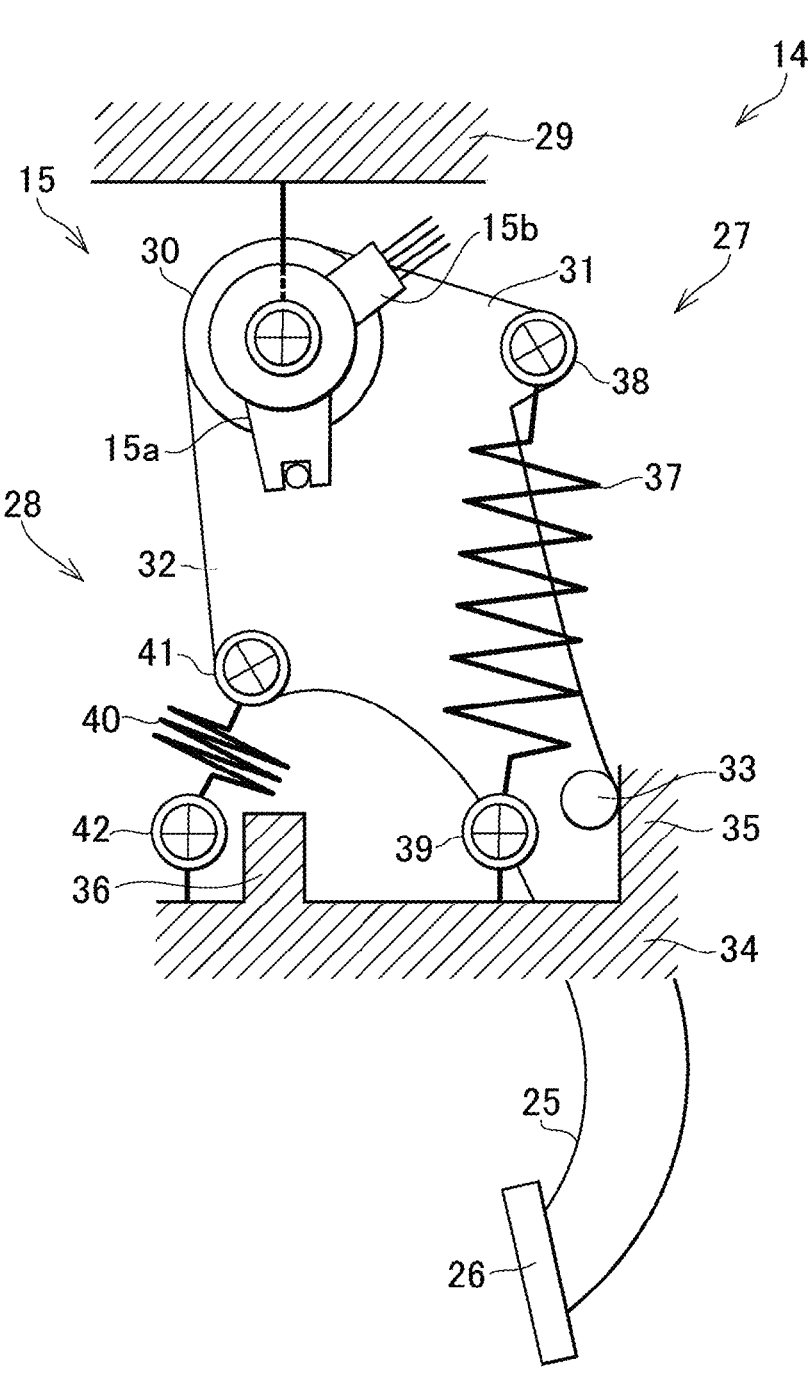
FIG. 4 is a cross-sectional view showing a cross-section of the pedal assembly according to the first embodiment of the present disclosure viewed from the right in a situation where the pedal arm is positioned at a stroke end position.

FIG. 4 shows a situation in which the pedal arm 25 is depressed to the deepest position as a stroke end. In this situation, the pin 33 is brought into contact with the front restriction portion 35, and the first arm pivotal joint 38 is further moved upwardly to a substantially same level as the support shaft 30 while being moved slightly forward. Consequently, the first arm pivotal joint 38 is situated slightly in front of the first fixed pivotal joint 39, but a resultant inclination of the first spring 37 is only a small degree. That is, the first spring 37 still remains substantially vertical in this situation.

Thus, the first spring 37 as a tension spring is expanded substantially in the vertical direction by depressing the pedal arm 25. That is, the reaction force the first reaction mechanism 27 exerts against the pedal force applied to the pedal pad 26 is proportional to the pedal force applied to the pedal pad 26. Therefore, the reaction force of the first spring 37 against the pedal force applied to the pedal pad 26 is increased linearly with a depression of the pedal arm 25 all the way from the initial position to the deepest position. Since the tension spring is adopted as the first spring 37, the pedal arm 25 is always subjected to the tension of the first spring 37 to be returned toward the initial position. That is, even when the pedal arm 25 is returned to the initial position, the pin 33 is pushed onto the rear restriction section 36 by the tension of the first spring 37.

The second reaction mechanism 28 is also adapted to exert a reaction force against the torque derived from the pedal force applied to the pedal pad 26 to depress the pedal arm 25. To this end, the second reaction mechanism 28 is arranged between the second projection 32 of the pedal arm 25 and another stationary member 34 of the vehicle 1. The second reaction mechanism 28 comprises a second spring 40 as a compression spring adapted to establish a reaction force against the torque derived from the pedal force applied to the pedal pad 26 to depress the pedal arm 25, a second arm pivotal joint 41 arranged in the second projection 32, and a second fixed pivotal joint 42 arranged in a lower end section of the second spring 40. Specifically, an upper end of the second spring 40 is joined to the second arm pivotal joint 41. Whereas, a lowest end of the second spring 40 is joined to another stationary member 34 and the second fixed pivotal joint 42 is arranged in the lower end section of the second spring 40. In the exemplary embodiment of the present disclosure, the second spring 40 serves as the spring, the second arm pivotal joint 41 serves as the arm pivotal joint, and the second fixed pivotal joint 42 serves as the fixed pivotal joint.

Since the compression spring is adopted as the second spring 40, the second projection 32 of the pedal arm 25 is elastically pushed upwardly by the second spring 40 so that the clutch pedal 14 is returned to the initial position in the situation where the pedal force is not applied to the pedal pad 26. When the clutch pedal 14 is depressed, the second arm pivotal joint 41 revolves downwardly around the support shaft 30 so that the upper end of the second spring 40 is pushed downwardly by the second arm pivotal joint 41. However, since the lowest end of the second spring 40 is joined to another stationary member 34, the second fixed pivotal joint 42 will not be moved downwardly in this situation. As illustrated in FIG. 2, the pedal arm 25 is designed such that the second arm pivotal joint 41 is situated at a position withdrawn from a neutral line L drawn between a rotational center of the support shaft 30 and a rotational center of the second fixed pivotal joint 42 in a reciprocating direction of the pedal arm 25 in the situation where the pedal arm 25 is not depressed. According to the first embodiment, specifically, the pedal arm 25 is designed such that the second arm pivotal joint 41 is situated at the rear of the neutral line L in the situation where the pedal arm 25 is not depressed. The pedal arm 25 is further designed such that an angle α between a line drawn between the rotational center of the support shaft 30 and a rotational center of the second arm pivotal joint 41 and the neutral line L is narrower than an angle β between a line drawn between the rotational center of the second fixed pivotal joint 42 and the rotational center of the second arm pivotal joint 41 and the neutral line L (α<β) in the situation where the pedal arm 25 is not depressed. In addition, in the situation where the pedal arm 25 is positioned at the initial position, the second arm pivotal joint 41 is situated lower than the first arm pivotal joint 38 in the vertical direction. As illustrated in FIG. 2, the pedal arm 25 is further designed such that a distance between the support shaft 30 and the second arm pivotal joint 41 in the longitudinal direction and a distance between the support shaft 30 and the first arm pivotal joint 38 in the longitudinal direction are substantially equalized to each other.

As described, a compression spring is adopted as the second spring 40 so that the pushing force of the second spring 40 always acts between the second arm pivotal joint 41 and the second fixed pivotal joint 42. Specifically, the tension of the first spring 37 is greater than the pushing force of the second spring 40 so that the pedal arm 25 is returned to the initial position in the situation where the pedal force is not applied to the pedal pad 26.

Here will be explained an action and a movement of the second reaction mechanism 28 during operation of the clutch pedal 14. In the situation where the pedal arm 25 is positioned at the initial position as illustrated in FIG. 2, the second arm pivotal joint 41 is situated at the rear of the second fixed pivotal joint 42 and the support shaft 30.

When the pedal arm 25 is depressed, the second arm pivotal joint 41 revolves downwardly forward around the support shaft 30 thereby compressing the second spring 40. Then, when the pedal arm 25 is depressed to the intermediate position as illustrated in FIG. 3, the rotational center of the second arm pivotal joint 41 comes to the neutral line L. In this situation, the second arm pivotal joint 41 descends to the lowest position in the orbital path so that the second spring 40 is compressed to the maximum. That is, the pushing force of the second spring 40 applied to the second arm pivotal joint 41 is increased to the maximum.

Thereafter, when the pedal arm 25 is depressed to the deepest position as illustrated in FIG. 4, the second arm pivotal joint 41 advances further than the neutral line L while moving upwardly away from second fixed pivotal joint 42. Consequently, the pushing force of the second spring 40 applied to the second arm pivotal joint 41 is weakened as compared to that in the situation where the second spring 40 is compressed to the maximum. Thus, the second spring 40 is compressed during a situation where the pedal arm 25 is depressed from the initial position to the intermediate position, and expanded during a situation where the pedal arm 25 is further depressed from the intermediate position to the deepest position. Thus, the pushing force applied to the second arm pivotal joint 41 from the second spring 40 is varied non-linearly in a quadratic manner while the pedal arm 25 is depressed from the initial position to the deepest position.

As described, in the situation where the pedal force is not applied to the pedal pad 26, the pedal arm 25 is returned to the initial position by the elastic reaction forces established by the first spring 37 and the second spring 40. In this situation, the pin 33 formed on the pedal arm 25 is brought into contact with the rear restriction section 36 formed on another stationary member 34 thereby restricting the pedal arm 25 to be withdrawn further than the rear restriction section 36.

When the pedal force is applied to the pedal pad 26 by the driver, the pedal arm 25 pivots around the support shaft 30 toward the front section of the vehicle 1. Consequently, the first spring 37 of the first reaction mechanism 27 is expanded so that the reaction force of the first spring 37 returning the pedal arm 25 toward the initial position is increased. Whereas, in the second reaction mechanism 28, the second spring 40 is compressed so that the reaction force of the second spring returning the pedal arm 25 toward the initial position is also increased. Thus, in the situation where the pedal arm 25 is depressed, a total reaction force returning the pedal arm 25 toward the initial position is increased with the depression of the pedal arm 25 until the pedal arm 25 is depressed to the intermediate position.

In this situation, specifically, the tension of the first spring 37 acting as the reaction force applied to the pedal arm 25 is increased linearly in proportion to the upward movement of the first arm pivotal joint 38 resulting from the depression of the pedal arm 25. Whereas, the pushing force of the second spring 40 also acting as the reaction force applied to the pedal arm 25 is increased non-linearly in a quadratic manner with the downward and forward displacement of the second arm pivotal joint 41.

Then, when the pedal arm 25 is depressed to the intermediate position, the second arm pivotal joint 41 is aligned with the support shaft 30 and the second fixed pivotal joint 42. Consequently, the second spring 40 is compressed by the second arm pivotal joint 41 to the maximum so that the reaction force applied to the pedal arm 25 from the second spring 40 is increased to the maximum.

Thereafter, when the pedal arm 25 is depressed further than the intermediate position, the second arm pivotal joint 41 is moved upwardly forward further than the neutral line L drawn between the support shaft 30 and the second fixed pivotal joint 42. Consequently, the second arm pivotal joint 41 is isolated away from the second fixed pivotal joint 42 so that the second spring 40 being compressed to the maximum is allowed to expand. In this situation, specifically, the pushing force applied to the pedal arm 25 from the second spring 40 is reduced non-linearly in a quadratic manner with the upward and forward displacement of the second arm pivotal joint 41. Whereas, the first spring 37 is expanded continuously in this situation by the first arm pivotal joint 38 moving upwardly in the substantially vertical direction so that the tension of the first spring 37 pulling the pedal arm 25 is increased continuously and linearly. According to the exemplary embodiment of the present disclosure, the first reaction mechanism 27 and the second reaction mechanism 28 are adapted such that the pushing force of the second spring 40 is reduced more than the increase in the tension of the first spring 37 in this situation. In this situation, therefore, the reaction force applied to the pedal arm 25 is reduced partially in a quadratic manner with the increase in the depression of the pedal arm 25 after the pedal arm 25 is depressed further than the intermediate position.

Eventually, the pin 33 of the pedal arm 25 comes into contact with the front restriction portion 35 so that the pedal arm 25 is stopped at the deepest end position. In this situation, the first spring 37 is expanded to the maximum, but the second spring 40 being compressed is expanded to a certain extent. That is, the second spring 40 is expanded compared to the situation in which the pedal arm 25 is positioned at the intermediate position. Therefore, as described, the reaction force applied to the pedal arm 25 is reduced with the depression of the pedal arm 25 while the pedal arm 25 is depressed from the intermediate position to the deepest position. Eventually, when the pedal arm 25 is depressed to the deepest position, the reaction force applied to the pedal arm 25 is reduced compared to that in the situation where the pedal arm 25 is positioned at the intermediate position. The first reaction mechanism 27 and the second reaction mechanism 28 are further adapted to reduce the reaction force applied to the pedal arm 25 when the pedal force applied to the pedal pad 26 is reduced so that the pedal arm 25 is returned from the deepest position toward the initial position, compared to that of the case in which the pedal arm 25 is depressed from the initial position toward the deepest position.

Thus, according to the first embodiment of the present disclosure, the reaction force is applied to the pedal arm 25 by the first reaction mechanism 27 and the second reaction mechanism 28. Specifically, the first reaction mechanism 27 is adapted to increase the reaction force applied to the pedal arm 25 linearly with the depression of the pedal arm 25 all the way from the initial position to the deepest position. On the other hand, the second reaction mechanism 28 is adapted to increase the reaction force applied to the pedal arm 25 non-linearly in a quadratic manner with the depression of the pedal arm 25 until the pedal arm 25 is depressed from the initial position to the intermediate position, and to reduce the reaction force applied to the pedal arm 25 non-linearly in a quadratic manner with the depression of the pedal arm 25 after the pedal arm 25 is further depressed from the intermediate position toward the deepest position.

Specifically, the reaction force applied to the pedal arm 25 is governed by loads applied to the first spring 37 and the second spring 40 and deflections of the first spring 37 and the second spring 40 derived from the loads applied to those springs. According to the first embodiment of the present disclosure, the load is applied to the first spring 37 from the first arm pivotal joint 38 moving downwardly in the substantially vertical direction in response to the depression of the pedal arm 25, and the load applied to the first spring 37 from the first arm pivotal joint 38 is substantially constant throughout the course of depression of the pedal arm 25.

Whereas, the load applied to the second spring 40 from second arm pivotal joint 41 is changed non-linearly in a quadratic manner in accordance with the revolution of the second arm pivotal joint 41 around the support shaft 30 during the course of depression of the pedal arm 25. According to the first embodiment of the present disclosure, therefore, the above-mentioned turnover property of the conventional clutch pedal for manipulating the manual transmission may be imitated by the first spring 37 and the second spring 40.

According to the first embodiment of the present disclosure, such turnover property of the conventional clutch pedal may be imitated by the simple structure of the clutch pedal 14. As explained, one end of the second spring 40 is joined to the second arm pivotal joint 41 arranged in the rear section of the pedal arm 25, and the other end of the second spring 40 is joined to another stationary member 34 through the second fixed pivotal joint 42. Therefore, the turnover property of the conventional clutch pedal may be imitated by the clutch pedal 14 without arranging a linkage member between the second spring 40 and the second arm pivotal joint 41 or the second fixed pivotal joint 42. In addition, the first spring 37 and the second spring 40 are individually installed to be compressed and expanded in the vertical direction. Therefore, the turnover property of the conventional clutch pedal may be imitated by the clutch pedal 14 while downsizing the clutch pedal 14. Furthermore, the first reaction mechanism 27 applying relatively large elastic force to the pedal arm 25 is arranged in front of the support shaft 30, and the second reaction mechanism 28 applying relatively small elastic force to the pedal arm 25 is arranged at the rear of the support shaft 30. Since the second spring 40 which is relatively smaller is arranged in the rear section of the clutch pedal 14, an adequate space to operate the clutch pedal 14 may be ensured.

Figure 5:
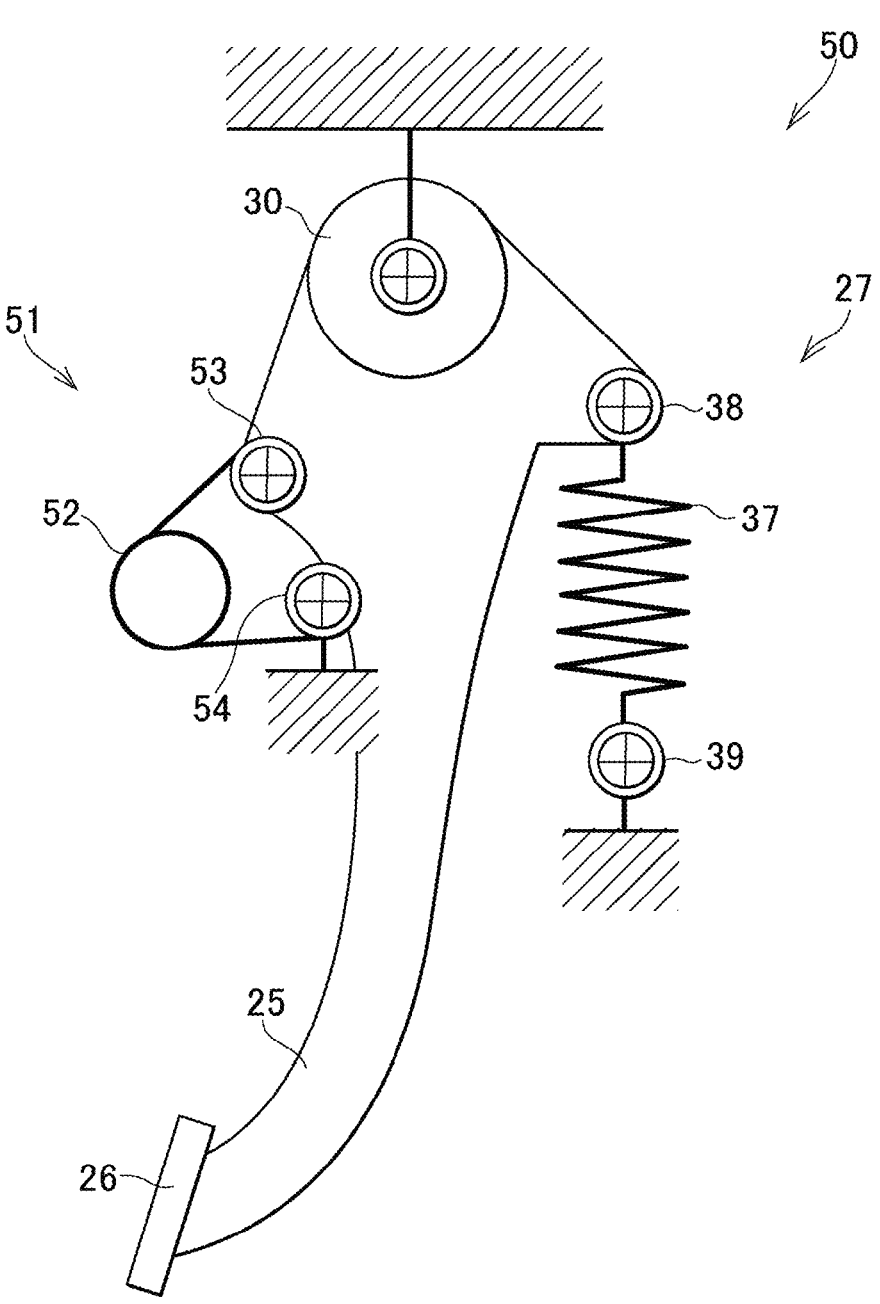
FIG. 5 is a cross-sectional view showing a cross-section of the pedal assembly according to the second embodiment of the present disclosure viewed from the right in a situation where the pedal arm is positioned at an initial position.

Next, here will be explained the second embodiment of the present disclosure with reference to FIG. 5. It is to be noted that the clutch sensor 15, the pin 33, and the restriction portions 35 and 36 are omitted in FIG. 5 for the sake of illustration. In a clutch pedal 50 according to the second embodiment, a torsion coil spring is adopted as a second spring 52 of a second reaction mechanism 51. Specifically, one of arms of the second spring 52 is joined to a second arm pivotal joint 53, and the other arm of the second spring 52 is joined to a second fixed pivotal joint 54. That is, a coil section of the second spring 52 is not supported by other members. According the second embodiment, therefore, a pushing force of the second spring 52 as a reaction force applied to the pedal arm 25 is also changed non-linearly in a quadratic manner in accordance with the revolution of the second arm pivotal joint 53 around the support shaft 30 when the pedal arm 25 is depressed.

Since the torsion coil spring is adopted as the second spring 52, an elastic force of the second spring 52 always acts between the second arm pivotal joint 53 and the second fixed pivotal joint 54. In addition, the tension of the first spring 37 that is greater than the elastic force of the second spring 52 is also applied to the pedal arm 25 so that the pedal arm 25 is returned to the initial position in the situation where the pedal force is not applied to the pedal pad 26.

When the pedal force is applied to the pedal pad 26, the second arm pivotal joint 53 revolves around the support shaft 30 toward the front section of the vehicle 1. Consequently, the arm of the second spring 52 joined to the second arm pivotal joint 53 is pulled downwardly by the second arm pivotal joint 53 so that the elastic force of the second spring 52 acting as a reaction force against a torque derived from the pedal force depressing the pedal arm 25 is increased non-linearly in a quadratic manner. Then, when the pedal arm 25 is depressed to the intermediate position, the second arm pivotal joint 53 is aligned with the support shaft 30 and the second fixed pivotal joint 54. Consequently, the arm of the second spring 52 joined to the second arm pivotal joint 53 is pulled by the second arm pivotal joint 53 to the lowest level. That is, an angle between the arms of the second spring 52 is reduced to the narrowest angle so that the reaction force applied to the pedal arm 25 from the second spring 52 is increased to the maximum in this situation.

After the pedal arm 25 is depressed further than the intermediate position, the second arm pivotal joint 53 revolves further than the second fixed pivotal joint 54 so that the arm of the second spring 52 joined to the second arm pivotal joint 53 is isolated away from the arm of the second spring 52 joined to the second fixed pivotal joint 54 with the depression of the pedal arm 25. In this situation, specifically, the angle between the arms of the second spring 52 is gradually widened to an initial angle with the depression of the pedal arm 25 so that the reaction force applied to the pedal arm 25 from the second spring 40 is reduced gradually. Thus, the elastic force of the second spring 52 is also varied non-linearly in a quadratic manner in accordance with the revolution of the second arm pivotal joint 53 around the support shaft 30. Therefore, the above-explained aspects of the first embodiment may also be achieved by the clutch pedal 50 according to the second embodiment. In addition, since the torsion coil spring is adopted as the second spring 52, the clutch pedal 50 according to the second embodiment of the present disclosure may be further downsized in the vertical direction.

Figure 6:
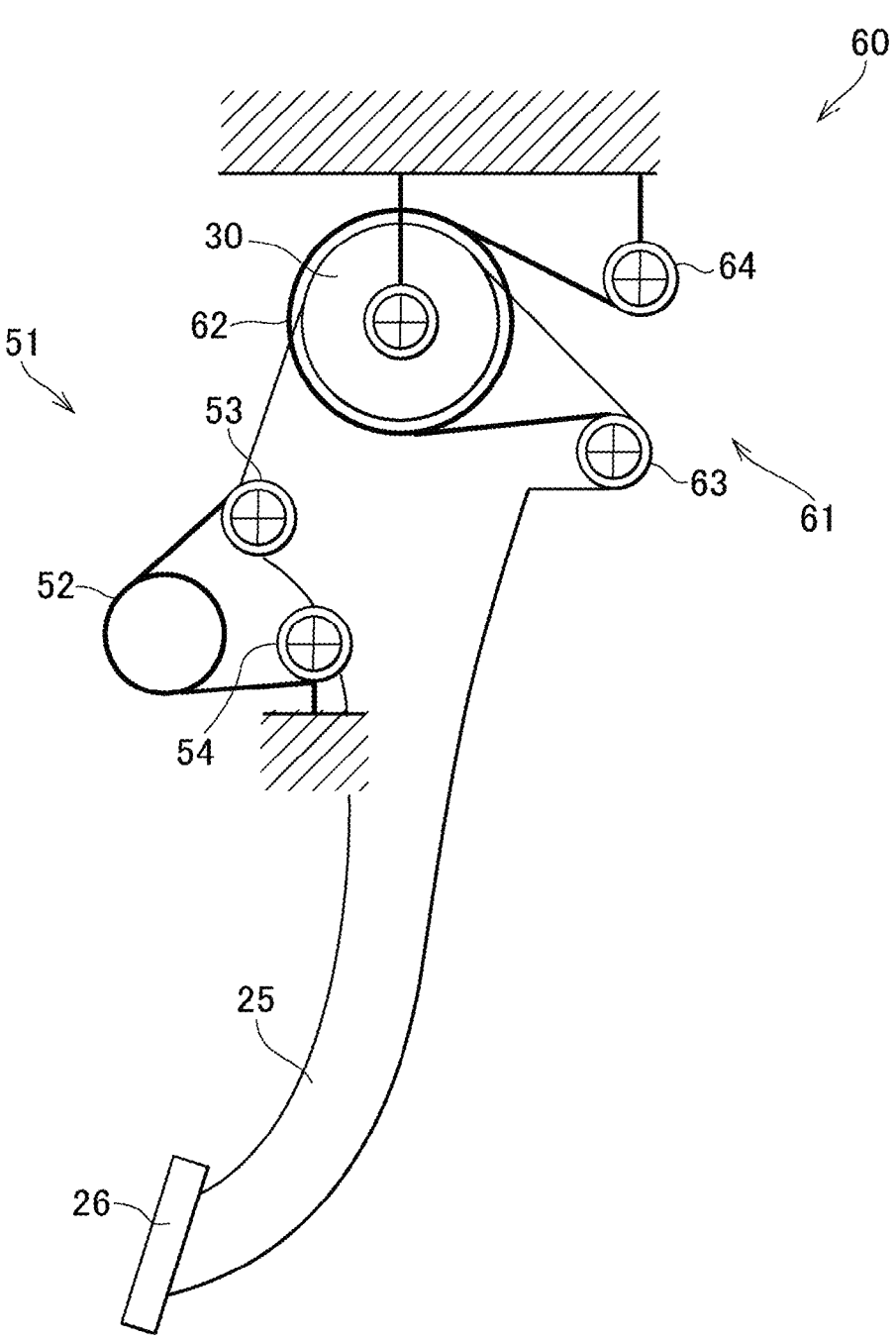
FIG. 6 is a cross-sectional view showing a cross-section of the pedal assembly according to the third embodiment of the present disclosure viewed from the right in a situation where the pedal arm is positioned at an initial position.

Next, here will be explained the third embodiment of the present disclosure with reference to FIG. 6. It is to be noted that the clutch sensor 15, the pin 33, and the restriction portions 35 and 36 are also omitted in FIG. 6 for the sake of illustration. As illustrated in FIG. 6, the second reaction mechanism 51 according to the second embodiment is also employed in a clutch pedal 60 according to the third embodiment. In addition, a torsion coil spring is also adopted as a first spring 62 of a first reaction mechanism 61.

Specifically, one of arms of the first spring 62 is joined to a first arm pivotal joint 63, and the other arm of the first spring 62 is joined to a first fixed pivotal joint 64. In addition, the support shaft 30 is inserted into a coil section of the first spring 62 while being allowed to rotate relatively with respect to the first spring 62. As the foregoing embodiments, the first spring 62 is adapted to apply an elastic force to the pedal arm 25 in the direction to return the pedal arm 25 to the initial position, and the elastic force of the first spring 62 is changed linearly in accordance with a reciprocation of the first arm pivotal joint 63. Since the torsion coil spring is adopted as the first spring 62, the clutch pedal 60 according to the third embodiment may be further downsized compared to the case of employing the tension spring as the first spring.

Figure 7:
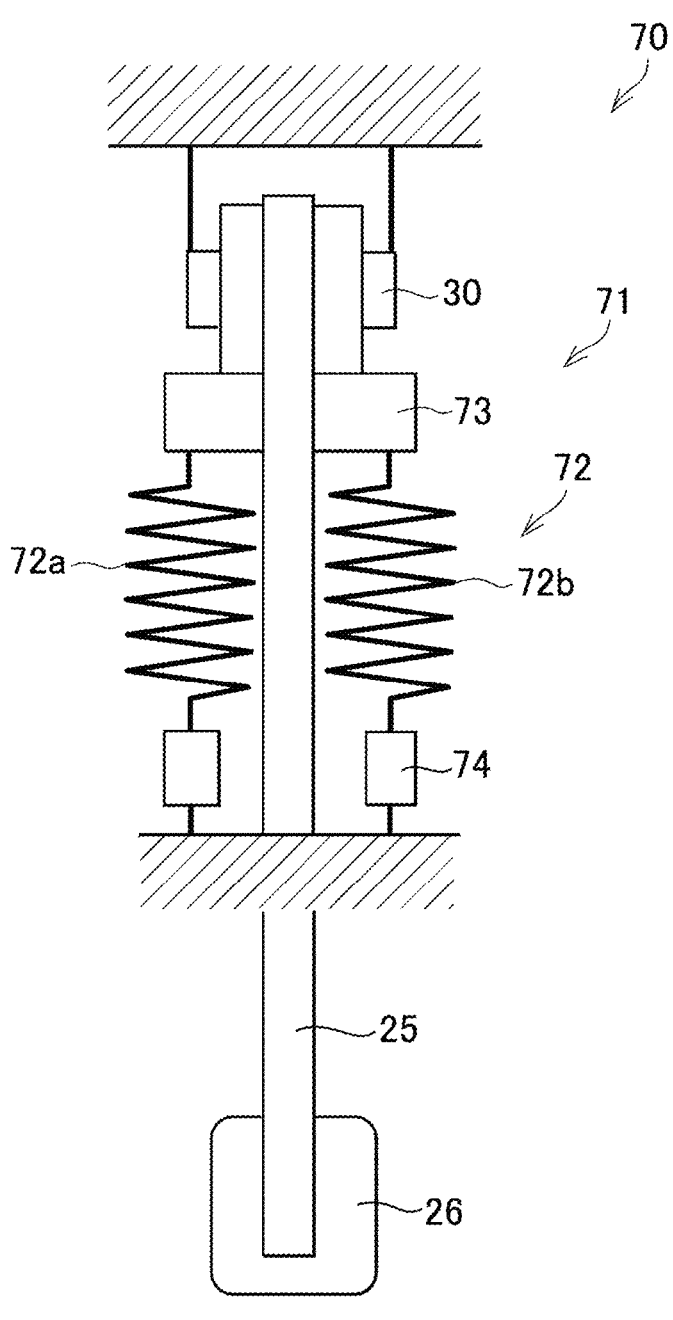
FIG. 7 is a cross-sectional view showing a cross-section of the pedal assembly according to the fourth embodiment of the present disclosure viewed from the front in a situation where the pedal arm is positioned at an initial position.

Next, here will be explained the fourth embodiment of the present disclosure with reference to FIG. 7. It is to be noted that the clutch sensor 15, the pin 33, and the restriction portions 35 and 36 are also omitted in FIG. 7 for the sake of illustration. Although not especially illustrated in FIG. 7, the second reaction mechanism 28 according to the first embodiment or the second reaction mechanism 51 according to the second embodiment may be employed in a clutch pedal 70 according to the fourth embodiment. According to the fourth embodiment, a spring 72 is provided. Specifically, the spring 72 includes a pair of first springs 72*a* and 72*b* are arranged in a first reaction mechanism 71, and a pair of extension coil springs is adopted as the first springs 72a and 72b. Specifically, as illustrated in FIG. 7, the first springs 72a and 72b are arranged in parallel on both sides of the pedal arm 25 in the width direction of the vehicle 1.

In addition, according to the fourth embodiment, a first arm pivotal joint 73 is widened in the width direction of the vehicle 1 compared to the first arm pivotal joints according to the foregoing embodiments. Upper ends of the first springs 72a and 72b are individually joined to the first arm pivotal joint 73, and lower ends of the first springs 72a and 72b are individually joined to a first fixed pivotal joint 74. According to the fourth embodiment, therefore, a shorter spring in which the number of coils is relatively small may be adopted as each of the first springs 72a and 72b. For this reason, the clutch pedal 70 may be further downsized in the vertical direction.

Although the above exemplary embodiments of the present disclosure have been described, it will be understood by those skilled in the art that the present disclosure should not be limited to the foregoing exemplary embodiments, and various changes and modifications may be made within the scope of the present disclosure. For example, a position of the second arm pivotal joint 41 or 53 to which the upper end of the second spring 40 is joined may be altered arbitrarily as long as the second arm pivotal joint 41 or 53 is withdrawn from the neutral line L drawn between the support shaft 30 and the second fixed pivotal joint 42 or 54 in the reciprocating direction of the pedal arm 25, and the angle α between the line drawn between the support shaft 30 and the second arm pivotal joint 41 or 53 and the neutral line L is narrower than the angle β between the line drawn between the second fixed pivotal joint 42 or 54 and the second arm pivotal joint 41 or 53 and the neutral line L.

Otherwise, positions of the second arm pivotal joint 41 or 53 and the second fixed pivotal joint 42 or 54 may be altered arbitrarily as long as the elastic force of the second spring 40 or 52 is varied in a quadratic manner in accordance with the revolution of the second arm pivotal joint 41 or 53 around the support shaft 30. For example, positions of the second arm pivotal joint 41 or 53 and the second fixed pivotal joint 42 or 54 may be altered as long as the second fixed pivotal joint 42 or 54 is allowed to pivot around the support shaft 30 and the elastic force of the second spring 40 or 52 is increased to the maximum when the pedal arm 25 is positioned at the intermediate position. Thus, the positions of the second arm pivotal joint 41 or 53 and the second fixed pivotal joint 42 or 54 may be adjusted arbitrarily to change the elastic force of the second spring 40 or 52 non-linearly in a desired manner.

For example, in a case of situating the second arm pivotal joint 41 or 53 closer to the neutral line compared to the foregoing examples, the reaction force applied to the pedal arm 25 may be increased to the maximum by depressing the pedal arm 25 only slightly. By contrast, in a case of situating the second arm pivotal joint 41 or 53 further to the neutral line compared to the foregoing examples, the reaction force applied to the pedal arm 25 may be increased mildly to the maximum.

In addition, the clutch pedal according to the foregoing embodiments may also be applied to other kind of vehicles without having a manual transmission so as to allow the driver to enjoy the manual shifting operation virtually.

What is claimed is:

1. A pedal assembly, comprising:

a pedal arm in which one end is joined to a predetermined stationary member through a supporting member in a pivotal manner;

a pedal pad formed on the other end of the pedal arm;

a spring that applies a reaction force to the pedal arm against a torque derived from a pedal force applied to the pedal pad to rotate the pedal arm around the supporting member; and another spring that applies a reaction force to the pedal arm against the torque derived from the pedal force, wherein:

one end of the spring is joined to the predetermined stationary member through a fixed pivotal joint, the other end of the spring is joined to an arm pivotal joint arranged in the pedal arm between the pedal pad and the supporting member, the arm pivotal joint is arranged at a site withdrawn from a neutral line drawn between the supporting member and the fixed pivotal joint in a reciprocating direction of the pedal arm, an angle between a line drawn between the supporting member and the arm pivotal joint and the neutral line is narrower than an angle between a line drawn between the fixed pivotal joint and the arm pivotal joint and the neutral line, one end of the another spring is joined to the predetermined stationary member through another fixed pivotal joint, the other end of the another spring is joined to another arm pivotal joint arranged in the pedal arm, the another arm pivotal joint is withdrawn from the neutral line in the reciprocating direction of the pedal arm, and the spring and the another spring include a coil spring and a torsion coil spring.

2. The pedal assembly as claimed in claim 1, wherein each of the spring and the another spring is adapted to apply the reaction force derived from an elastic force to the pedal arm.

3. The pedal assembly as claimed in claim 1, wherein the arm pivotal joint and the another arm pivotal joint are situated across the neutral line.

4. The pedal assembly as claimed in claim 1, wherein the another spring further includes a tension spring.

5. The pedal assembly as claimed in claim 1, wherein a plurality of the tension springs are arranged in parallel to apply elastic tensile force to the pedal arm in the same direction.

6. The pedal assembly as claimed in claim 1, wherein the pedal assembly is applied to an electric vehicle in which an electric motor is adopted as a prime mover, the pedal assembly further comprises a clutch sensor that detects a depression angle of the pedal arm, and the electric motor is controlled based on a detection signal transmitted from the clutch sensor.

7. The pedal assembly as claimed in claim 6, wherein the electric vehicle comprises a shifting device, and a virtual gear stage governed by a rotational speed and an output torque of the electric motor is shifted among a plurality of stages by operating the shifting device.

* * * * *